United States Patent [19]

Butterfield

[11] Patent Number: 4,810,207
[45] Date of Patent: Mar. 7, 1989

[54] COMBINED ELECTRICAL AND MECHANICAL COUPLING FOR CEILING MOUNTED DEVICE

[75] Inventor: William P. Butterfield, Ramona, Calif.

[73] Assignee: H. P. Incorporated, Ramona, Calif.

[21] Appl. No.: 93,587

[22] Filed: Sep. 4, 1987

[51] Int. Cl.$^4$ .................................. H01R 13/73
[52] U.S. Cl. .................................. 439/529; 439/533; 439/542; 439/576
[58] Field of Search ............ 439/100, 450, 529, 531, 439/533, 542, 543, 576

[56] References Cited

U.S. PATENT DOCUMENTS

| | | | |
|---|---|---|---|
| 447,832 | 3/1891 | Kintz | 439/529 |
| 756,050 | 3/1904 | Pitel | 439/529 |
| 1,043,179 | 11/1912 | Weeks | 439/543 |
| 2,700,140 | 1/1955 | Phillips | 339/94 |
| 2,766,434 | 10/1956 | Gear | 339/122 |
| 3,033,049 | 5/1962 | Morrow | 74/209 |
| 3,233,202 | 2/1966 | Kyle | 339/30 |
| 4,390,226 | 6/1983 | Hohn | 339/89 M |
| 4,637,673 | 1/1987 | Yang | 339/89 M |
| 4,655,531 | 4/1987 | Delaney | 439/450 |

*Primary Examiner*—John McQuade
*Attorney, Agent, or Firm*—Brown, Martin, Haller & Meador

[57] ABSTRACT

Apparatus is disclosed for releaseably and mechanically attaching an electric-motor-driven device (22), such as a ceiling fan, to an overhead support, such as a ceiling (10). The apparatus comprises a generally vertically disposed downrod (24) having an upper portion (25), a lower portion (46) and a wall (37) defining a hollow interior (36) extending longitudinally therethrough, with the downrod adapted to be non-rotatably secured at the upper end of the upper portion to the overhead support; first electrical contacts (52, 52') preferably recessed in the end of the lower portion of the downrod; a hub (68) on the top of the device; one of the lower portion of the downrod or the hub having a recess to enclose the other in a mating connection; second electrical contacts (76, 76') in the recess aligned with the first electrical contacts and forming a mating connection therewith when the lower portion of the downrod and the hub are connected; a locking pin (54) to releasably secure the hub and the lower portion of the downrod in rigid and non-rotation connection when the one is enclosed in the recess in the other; a first electrical conductor (38, 38') passing through the hollow interior of the downrod to the first electrical contacts and electrically connecting the first electrical contacts to a source of electrical current; and a second electrical conductor (84, 84') electrically connecting the second electrical contacts to the electric motor (21).

22 Claims, 3 Drawing Sheets

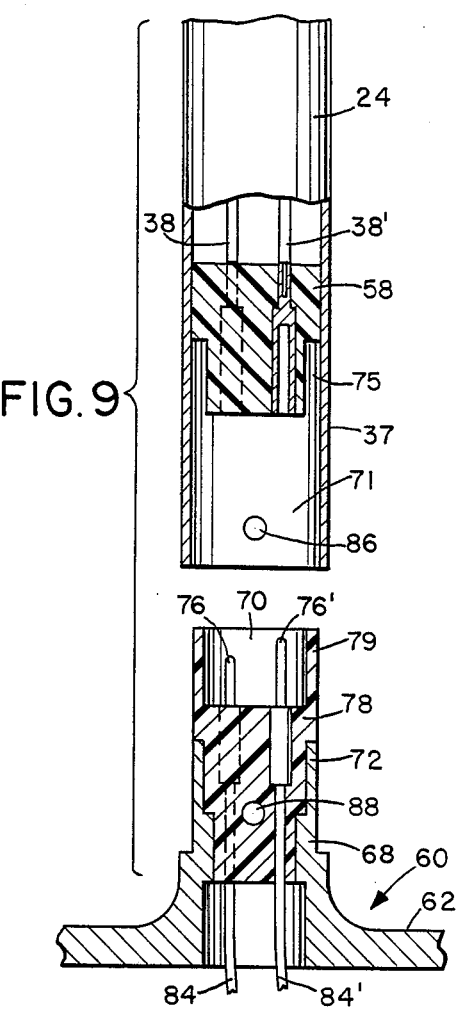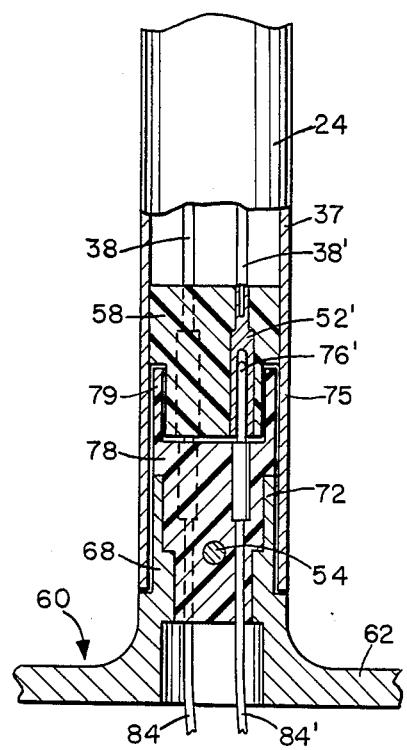
FIG. 9
FIG. 10

COMBINED ELECTRICAL AND MECHANICAL COUPLING FOR CEILING MOUNTED DEVICE

FIELD OF THE INVENTION

The invention herein relates to apparatus for electrically and mechanically suspending motor driven devices from overhead supporting structures.

BACKGROUND OF THE INVENTION

Devices mounted overhead to be suspended downwardly from a ceiling or other overhead support are well known. They can be divided generally into two categories: static devices and dynamic, motor-driven devices. Lighting fixtures are examples of the former and ceiling fans are examples of the latter. While the considerations involved in mounting both types of devices would appear to be generally similar, they are in fact quite different. The problems are much more severe with respect to the dynamic units as compared to the static units.

When initially mounting the unit the installer must normally contend with a greater weight problem with the dynamic units. Most light fixtures can be substantially disassembled with only the base being supported during mounting. Light bulbs, refractors and reflectors can usually be attac'ed after the base unit is mounted and electrically wired so that the installer has little problem dealing with the weight of the unit during installation. The motor driven dynamic units, on the other hand, must be mounted initially with the full weight of the motor and motor housing so that the electrical connections can be made. The problems of supporting a heavy motor and housing overhead while mechanically and electrically attaching them to supports are apparent.

Subsequent maintenance also involves significantly different degrees of difficulty. Most lighting fixtures require virtually no maintenance except for occasional changing of burned out light bulbs. There is rarely need to dismount the lighting fixture from its overhead support or to disconnect its wiring. The dynamic units such as fans, however, commonly need motor servicing during their lifetime and not infrequently an entire motor unit needs to be overhauled. Such maintenance usually requires that the motor be dismounted from the support and the electrical wiring be disconnected so that the motor (and the related housing) can be removed to a work area for the needed service. As with the initial installation, the problems of dismounting and remounting a heavy motor unit and its housing are evident.

Finally, and most importantly, a static fixture like a lighting fixture places no forces on the mounting supports except the downward pull of the unit's weight. A dynamic motor driven unit, on the other hand, imparts to the support the torque generated by the rotational motion of the motor and a greater or lesser amount of vibration generated by the operation of the motor and other moving parts of the device, such as fan blades, as well as the downward thrust of the unit's weight (which as noted above is often significantly greater than the weight of an equivalent lighting fixture). The torque and vibration may be quite substantial if one is dealing with a ceiling fan with a high output motor and long fan blades.

Through pin connectors to join prior art devices to downrods have been known. However, in the prior art units Where loose wires pan through the downrod, the wires and pins frequently interfere and often the pins will cut the wires' insulations and cause a short circuit. In addition, it is extremely difficult for an installer to connect a device to a downrod while simultaneously trying to manipulate the wires and pins so that they avoid each other.

It would therefore be of particular interest to have a mounting system which would allow for rapid and easy mounting of devices such as fans to overhead mounts and which would insure that secure and safe electrical connections could be made. It would be particularly advantageous for such apparatus to incorporate means to make the electrical connections simultaneously as the unit was being mechanically mounted. It would further be advantageous for the mounting means to be such that quick and simple demounting would be possible, followed by equally quick and simple remounting, to permit maintenance to be conducted as easily as possible.

BRIEF SUMMARY OF THE INVENTION

The invention herein comprises apparatus for releasably electrically and mechanically attaching an electric-motor-driven device to an overhead support. In its broadest form the invention comprises a generally vertically disposed downrod having an upper portion, a lower portion and a wall defining a hollow interior extending longitudinally therethrough, with the downrod adapted to be non-rotatably secured at the upper end of the upper portion to the overhead support; first electrical contact means in the end of the lower portion of the downrod; a hub on the top of the device; one of the lower portion of the downrod or the hub having a recess in the end thereof to enclose the other in a mating connection; second electrical contact means in the hub aligned with the first electrical contacts means and forming a mating connection therewith when the lower portion of the downrod and the hub are connected; locking means to releasably secure the hub and the lower portion of the downrod in rigid and non-rotating connection when one is enclosed in the recess in the other; first electrical conductor means passing through the hollow interior of the downrod to the first electrical contact means and electrically connecting the first electrical contact means to a source of electric current; and second electrical conductor means electrically connecting the second electrical contact means to the electric motor.

In preferred embodiments the apparatus also comprises means for concentrically aligning the downrod and the hub and means for insuring the proper sequence of electrical connection formation when the device and the downrod are attached. The apparatus may incorporate multi-segment downrods.

In other preferred embodiments the first electrical contact means are female contacts recessed in the end of the downrod, and the second electrical contact means are male contacts.

In yet other preferred embodiments the recess is in the hub and the lower portion of the downrod fits into it.

In a preferred embodiment the device to which this apparatus pertains is a ceiling fan.

BRIEF DESCRIPTION OF THE DRAWINGS

FIGS. 9 and 10 are elevation views, partially in section, showing an embodiment where the downrod encloses the hub, in disconnected and connected form, respectively.

DETAILED DESCRIPTION AND PREFERRED EMBODIMENTS

Figure 1:
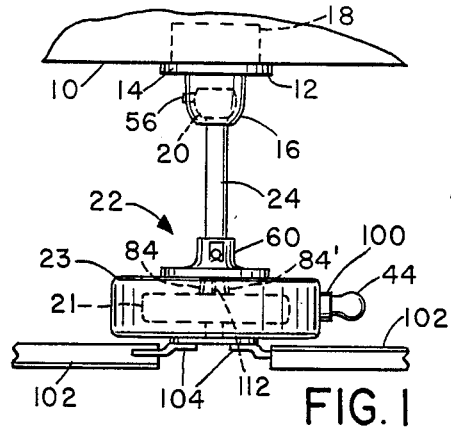
FIG. 1 is a partial side elevation view showing a ceiling fan suspended from an overhead support according to the present invention.

The invention herein is best understood by reference to the drawings. FIG. 1 illustrates the overall concept of the device and its setting in its environment. The device is suspended downwardly from an overhead structure such as ceiling 10. This overhead structure may be a conventional ceiling, a ceiling joist, an overhead grid system or any similar structure. In the embodiment shown the overhead structure is exemplified by horizontal ceiling 10. It may, however, as in the case of a cathedral ceiling in a residence, be sloped at an angle. Attached directly to ceiling 10 is mounting device 12 which comprises a flat base 14 to which is attached a partially hollowed cup 16. Positioned above mounting device 12 is junction box 18. The mounting device 12 is conventional and is attached to the ceiling 10 through base 14 by ordinary fastening means such as screws (not shown). The cup 16 has an opening on one side which permits the insertion of ball 20 which is seated in cup 16. The interior of cup 16 is rounded to conform to the shape of ball 20. Use of ball 20 and mating cup 16 allows the fan unit 22 to hang vertically downward from the mounting device 12 regardless of whether the ceiling is horizontal or angled. The interior of cup 16 communicates with the interior of junction box 18 such that electrical wires 38 can be run from cup 16 into junction box 18 for connection to an electrical power supply.

Connected to ball 20 is vertically oriented hollow downrod 24 which supports the unit 22 at the desired level below the ceiling 10. Downrod 24 is normally attached to ball 20 by passing upper portion 25 upwardly through a hole 26 in ball 20. Hole 26 expands into recess 28 and the lower portion of recess 28 forms shoulders 30. Rigid pin 32 is seated in opposed holes 34 in the wall of downrod 24 and the ends of the pin 32 extend outwardly beyond downrod 24 to engage shoulders 30. The pin 32 is normally made of steel or some similar strong rigid material, since the entire weight of downrod 24 and fixture 22 is supported by pin 32.

Running coaxially through the hollow interior of 36 defined by wall 37 of downrod 24 are electrical wires 38 and 38'. The wires 38 are one segment of the electrical leads to the motor 21 of unit 22. Two such wires are needed to power the motor 21 although in the present illustration three wires are shown. This provides for a motor lead, a separate lead to another electrical device such as light bulb 44 which may be mounted in association with unit 22 and a neutral return line 38'. There may be additional wires 38 if leads to other components are desired. Also entering recess 28 and electrically connected to the side of downrod 24 is ground wire 40. The connection as illustrated is made by screw terminal 42. This allows the downrod 24 and unit 22 to be properly grounded. Of course, this will be the situation only if downrod 24 is made of metal or other conductive material. Should downrod 24 be made of plastic or some other non-electrically conductive material, ground wire 40 will extend through the interior 36 of downrod 24 and, through a separate pin-and socket connection and wire from the connection (as described below for other conductors), will ground the motor 21 and housing 23 directly.

Downrod 24 may be of any length suitable to particular installation at hand. If the ceiling fan or like dynamic fixture is intended to be close to the ceiling (as for instance in a low ceiling classroom) then downrod 24 will be only a few inches long. On the other hand, in a high ceiling room, such as one with a cathedral ceiling or the high ceiling of a restaurant dining area, the downrod 24 may be substantially longer in order to place the fan well away from the ceiling and improve the flow of air generated by the fan's operation. In this case, the downrod 24 may be up to several feet in length. For instance, downrods having a length of four feet (1.2 meters) are not uncommon. The exact length of the downrod 24 is not critical to the present invention, except that the advantages of the present invention for ease of maintenance are more pronounced with longer downrods as will be discussed below.

Figure 3:
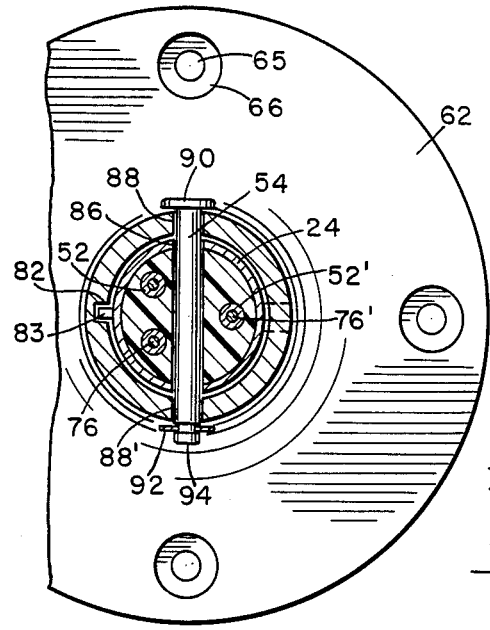
FIG. 3 is a sectional view taken on line 3—3 of FIG. 2.
Figure 4:
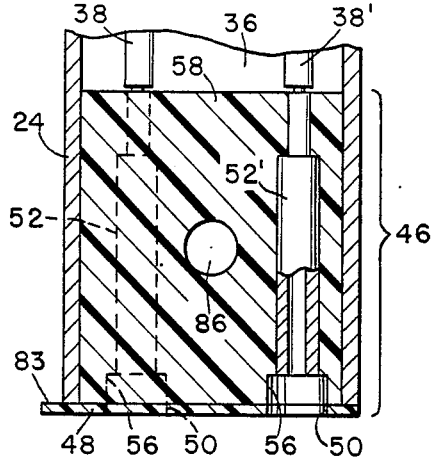
FIG. 4 is an elevation view, partially in section, of the lower end portion of the downrod.
Figure 6:
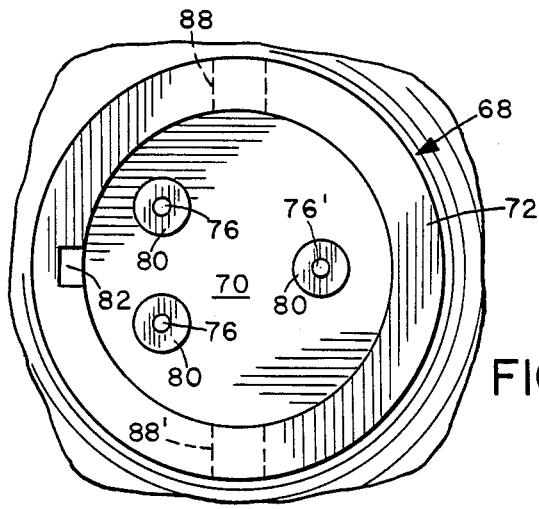
FIG. 6 is a top plan view of the recess in the hub portion of the motor housing.

Downrod 24 terminates at its lower (distal) end in terminal region 46 which is illustrated in detail in FIG. 4. At the lower end of terminal region 46 is end surface 48 which is perforated by holes 50 aligned with female electrical contacts 52 and 52'. End surface 48 may be the lower end of insulating material 58 or it may be a separate plate as illustrated. These female contacts 52, 52' may be replaced by male contacts protruding from the insulation 58, with of course a reciprocal change from male to female of the contacts 76, 76' in hub 60. However, since the contacts 52, 52' are connected directly to the power source, it is preferred for safety reasons that they be recessed female contacts. The number of electrical contacts 52 will be equal to the number of lead wires 38 and each lead wire will feed to a different contact 52. Any convenient arrangement of the contacts 52 and 52' may be used, provided that adequate clearance is retained for passage of anchor pin 54 in the manner which will be described below. A pattern which has been found quite useful is that shown in FIGS. 3 and 6, where the single contact 52' is the neutral return connecting to wire 38 and the paired contacts 52 are the powered leads connected to wire 38.

The lower ends of contacts 52 are recessed a short distance into recess 56 for safety purposes. This recess 56 essentially prevents anyone from inadvertently touching the contacts 52 since contacts 52 are live contacts if current is applied to wires 38.

Surrounding contacts 52 and fully filling the terminal portion 46 of downrod 24 is insulating material 58. This insulating material will be an substantially rigid in order to retain contacts 52 in their proper position. However, it is not a weight bearing material, so it may be a plastic foam, a rigid plastic, a rubber or any similar insulating material. (While the material is described as "substantially rigid", it will permit slight lateral movement of the electrical contacts to facilitate alignment of the plug and socket contacts.)

Mounted atop or set into motor housing 23 is hub 60. Hub 60 may be a separate part which is attached to housing 23, or it may be attached directly to motor 21. Alternatively it can be an integral compartment of the housing (e.g., molded as a one-piece unit with the rest of the housing) or it may be an integral part of the motor case. In the embodiment illustrated the hub 60 is a separate part attached to the housing, by having extended base flange 62 of hub 60 connected directly to housing 23 by bolts 64 penetrating through holes 65 and seated in counterbores 66. The number and placement of holes 65 and bolts 64 will depend on the size of the housing 23 and the weight of unit 22 to be supported. With common household ceiling fans, four bolts arranged 90 degrees apart around the flange 22 as shown in FIG. 3 are usually quite adequate.

Figure 5:
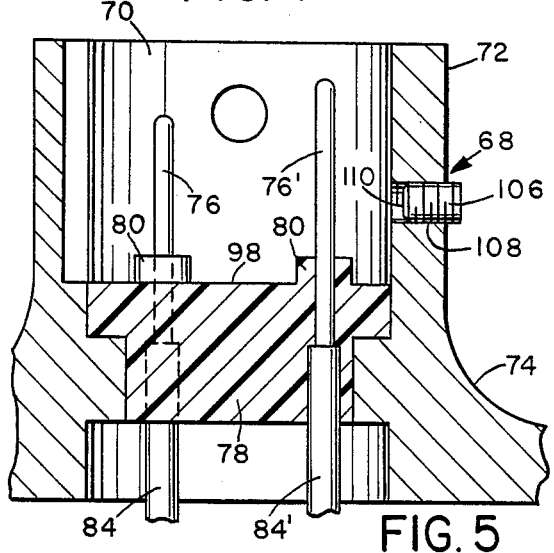
FIG. 5 is an elevation view, partially in section, of the hub portion of the motor housing.

Extending upwardly from the flange 62 of hub 60 is annular sleeve 68 illustrated in detail in FIG. 5. Sleeve 68 contains a central recess 70 which is defined by an annular outer wall 72 The junction between annular outer wall 72 and base 66 is rounded by fillet 74 in accordance with good stress dispersal practice.

Projecting upwardly into recess 70 are male electrical contacts 76 and 76'. These in turn mate respectively with female electrical contacts 52 and 52' and of course are aligned therewith. In the embodiment shown contact 76' is longer than contact 76 since it is the neutral return. Good electrical practice dictates that the neutral return line connection be made first before any of the powered line contacts are made, so that when the two components of the invention are joined together, contacts 76' and 52' mate first and create a neutral return connection before contacts 76 and 52 mate to form the live connection.

Electrical contacts 76 and 76' are securely retained in substantially rigid insulation 78 which fills the lower portion of the interior 70 of sleeve 68. (As with the insulating material 58, the material does permit slight lateral movement to facilitate alignment of the contacts.) Parts of insulating material 78 preferably extend upwardly to form annular disks 80 which fit into and are contained by recesses 56 in insulating material 58. This serves to maintain a complete insulating body 58/78 with no significant air gaps when the unit is fully assembled. It also help to prevent lateral or rocking motion of the unit 22 during insulation or after assembly.

A keyway 82 is recessed into one side of the wall 72 of sleeve 68 and serves as a guide for key 83 which projects radially outwardly from the lower end of downrod 24 (or, as shown from plate 48). Alternatively, the converse structure can be used in which the keyway is formed in the wall of the downrod and the key is disposed at the top of the hub.

Electrical leads 84 and 84' which extend from contacts 76 and 76' respectively are directly connected to motor 21 or to motor control circuitry within housing and provide for continuity of electrical current flow to motor 21.

Figure 2:
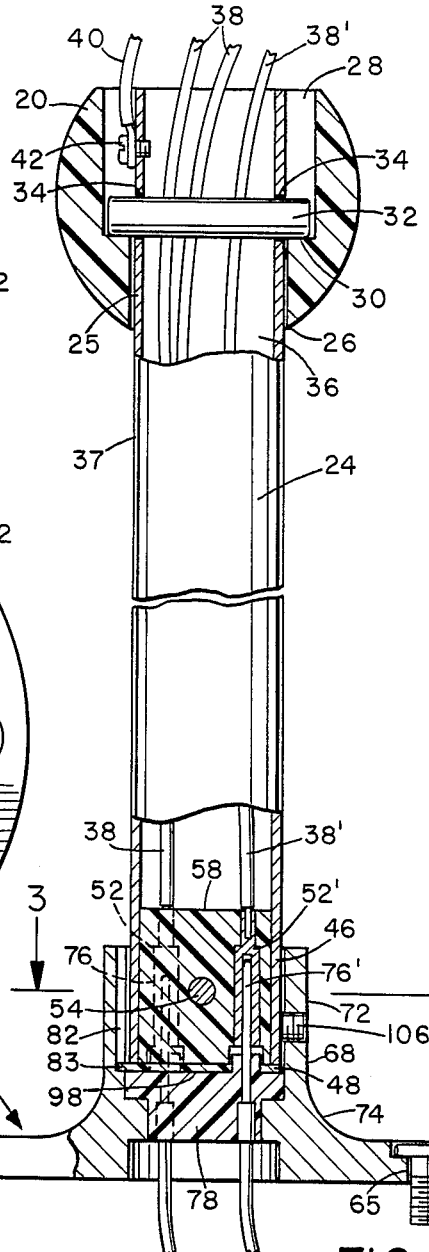
FIG. 2 is a side elevation view, partially in section, showing the component parts of the device of the present invention.

Hole 86 passes laterally through the lower portion of the wall of downrod 24 and through insulation 58. Holes 88 and 88' in wall 72 of sleeve 68 are aligned with hole 86 by means of electrical contacts 52, 52', 76, 76' and keyway 82 and key 83. When the unit is assembled as shown in FIG. 2, pin 54 extends completely through holes 88, 86, and 88' and is retained therein. Head 90 at one end of pin 54 and clip 92 attached to the opposite end of pin 54 (projecting outwardly from hole 88) prevent pin 54 from becoming dislodged from its seated position in holes 88, 86, and 88'. Clip 92 may be seated in a groove or a hole adjacent the end 94 of pin 54 in the manner of conventional locking devices such as clips and cotter pins.

Figure 8:
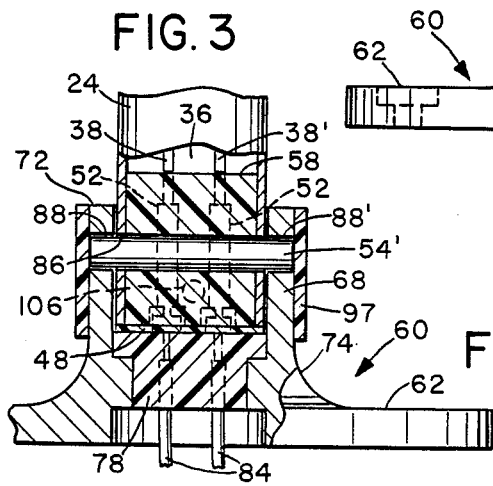
FIG. 8 is an elevation view, partially in section, showing an alternate means of securing the downrod and hub together.

Alternatively, the locking pin system shown in FIG. 8 can be used. In this embodiment the pin 54' has no head 90 or clip 92, and is of a length just equal to the outside diameter of wall 72. When the downrod 24 and hub 60 are properly mated, pin 54' is inserted in the holes 86, 88, and 88' and seated so that its outer ends are aligned with the outer side of wall 72. Annular locking sleeve 97 then slides down over the outside of sleeve 68 of hub 60 with a slight clearance fit and secures pin 54' in place Also, alternatively, pin 54 could be eliminated and the downrod 24 and hub 60 secured together with a plurality of set screws 106 disposed radially around the circumference of the downrod and hub. This is less preferred, however, since it does not provide as secure a connection and means that the installer has more adjustments to make than if the pin 54 were used.

The ease of use of this invention will now be apparent, particularly to reference to FIG. 2. During insulation the installer secures ball 20 to downrod 24 with pin 32. This assembly is then placed in cup 16 and the electric wires 38 38' and 40 are attached to the respective live neutral and ground electrical power source lines at connections in junction box 18. The downrod 24 is then aligned vertically. If desired, ball 20 may be locked into position in cup 16 as by set screw 56 since it will no longer need to be moved unless the entire assembly is being dismantled or a different length of downrod is to be installed.

The single unit 22 with housing 23 motor 21 and hub 60 assembled is then simply lifted into position below downrod 24 the electrical contacts, key and keyway aligned and the unit 22 pushed upward with sleeve 68 surrounding the terminal portion of 46 of downrod 24 until the respective electrical contacts mate and bottom surface 48 seats by contact with the top surface 98 of insulation 78. The installer then merely inserts pin 54 through the aligned holes 88, 86 and 86' and attaches clip 92. The entire device is then mechanically and electrically connected and the motor 21 may be operated.

It is normally at this time that light bulb 44 would be plugged into socket 100 if that was part of unit 22. Also normally at this time fan blades 102 are installed in the conventional manner by inserting bolts (not shown) through brackets 104 attached to the inward ends of blades 102. Because of the ease of installation of the present device, however, the blades 102 may be installed prior to raising the unit 22 into position and locking it onto the end of downrod 24 as previously described, as long as the earlier connection of the blades 102 does not make the unit 22 too heavy or unwieldy for the installer to raise into position comfortably and safely.

Grounding continuity between downrod 24 and unit 22 is obtained after connection of the unit 22 and downrod 24 and securing of pin 54 by means of set screw 106 which is turned inward in threaded hole 108 until the inward end 110 of set screw 106 comes into contact with the outer surface of the lower portion 46 of downrod 24. This of course will be effective only if downrod 24 and hub 68 are both of conductive materials such as metal, otherwise as discussed above there will be an additional electrical contact pair connected to the extension of wire 40 and an equivalent ground wire 112 within housing 23 leading to motor 21. For most purposes, it is desirable to have the downrod 24, hub 68 and housing 23 all made of metal and in proper metal-to-metal contact so that the housing 23 will be grounded through hub 68, set screw 106 and downrod 24 to grounding wire 40.

The set screw 106 can be located at any desirable point radially around the circumference of the downrod and hub. When tightened it also serves to help secure the downrod and hub in a fixed connection.

It will be immediately apparent that this system is extremely simple and convenient. The unit 22 may be dismounted for maintenance simply by disconnecting clip 92 and removing pin 54 or raising sleeve 97 and removing pin 54' which allows the unit 22 to be dropped free of downrod 24. The electrical connections are automatically uncoupled with no need for electrical wires to be separated from one another. Remounting of the unit 22 is equally simple and convenient, and simply constitutes raising the unit 22 back into position aligned properly with downrod 24 and reinserting pin 54 or 54', securing it with clip 92 or sleeve 97. The electrical connections are again automatically made with no need to reconnect individual wires.

In addition, at no time does the installer need to touch any of the electrical contacts or fittings. Therefore the danger of electrical shock to the maintenance worker or installer is virtually nonexistent.

It will be evident that the initial installation of this type of unit can be accomplished in a few minutes, with the only electrical connections which need to be made being those of wires 38, 38' and 40 to the power source and ground in junction box 18. Thereafter, the unit 22 can be mounted or dismounted in an extremely short time, so that the installer or maintenance person need not be forced to stand in an awkward or dangerous position, such as atop a ladder or on a scaffolding, and support the weight of the unit 22 in some manner while trying to connect or disconnect pairs of lead wires.

Figure 7:
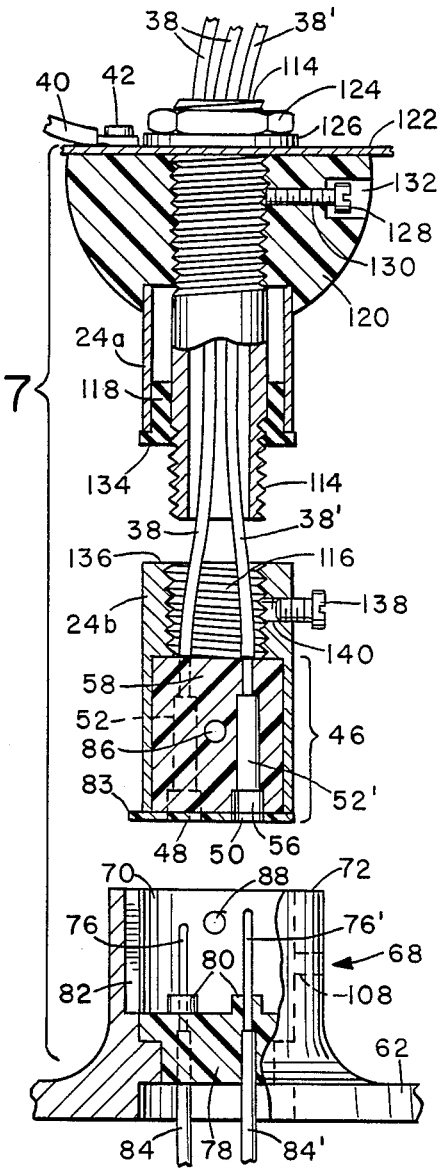
FIG. 7 is an exploded side elevation view, partially in section, of another embodiment of the device of this invention.

An alternative form of the present invention is illustrated in FIG. 7. This embodiment is designed for use with downrods which are in two sections 24a and 24b and which are typically joined by a threaded nipple 114 extending downwardly from the lower end of upper downrod portion 24a and which engages the interior threading 116 on the inside of the upper end of lower downrod portion 24b. Commonly the middle portion of nipple 114 is surrounded by insulation 118 and at its upper end nipple 114 is threaded through ball 120 and extends upwardly through the overhead support 122 (in this case shown as a flat plate) and secured thereabove by nut 124 bearing on washer 126. Retention of nipple 114 in position is maintained by set screw 128 which is seated in hole 130 and recessed in counterbore 132 and is turned in until it bears firmly against the exterior surface of nipple 114. The lower portion of 24b of downrod 24 is then threaded onto the lower (distal) end of nipple 114 until the surfaces 134 and 136 come into firm contact. The connection is then further secured by turning in set screw 138 in hole 140 until it bears firmly on the outer threads of the distal end of nipple 114. This in effect converts the two portions of 24a and 24b of downrod 24 into a single unit which then exposes the terminal portion 46 for connection of the unit 22 in the same manner as with the embodiment illustrated in FIG. 2.

The embodiment of FIG. 7 is particularly useful in those situations where the downrods are of an older type which commonly terminate at their distal ends in threaded connections such as nipple 114. It is many of these older types of downrods which have been found to be so difficult to work with, since a unit analogous to unit 22 with its hub, housing, and motor would have to be threaded onto the distal end of the downrod and then the electrical connections made by joining pairs of wires. As previously discussed, this type of connection is difficult and dangerous to make and does not permit efficient and safe mounting and demounting of the unit. By terminating the lower end of the old fashioned downrod with the portion 24b to convert it into a downrod 24 for the present invention, the older downrod installations can be effectively made as efficient in this invention as the downrods 24 designed specifically for this installation.

Yet another embodiment is shown in FIGS. 9 and 10. In this embodiment the diameter of the downrod 24 is greater than that of the hub 60, and the former has recess 71 in the lower end thereof. Hub 60 also may have a recess 70; the male contacts 76, 76' project upward from the top surface of insulation 78. An upwardly projecting annular portion 79 of insulating material 78 fits into groove 75 formed by insulation 58 and wall 37. It would also be possible to reverse the design so that the hub 60 had female contacts in insulation 78 and the male contacts were recessed into the recess 71. This would in effect be the converse of the structure shown in FIGS. 4 and 5.

It will be evident that there are additional embodiments which are not illustrated above but which are clearly within the scope and spirit of the present invention. The above description and drawings are therefore intended to be exemplary only and the scope of the invention is to be limited solely by the appended claims.

We claim:

1. Apparatus for releasably electrically and mechanically attaching an electric-motor-driven device to an overhead support comprising:
   a generally vertically disposed downrod having an upper portion, a lower portion and a wall defining a hollow interior extending longitudinally therethrough, said downrod adapted to be non-rotatably secured at the upper end of said upper portion to said overhead support;
   first electrical contact means in the end of said lower portion of said downrod;
   a hub on the top of said device;
   one of said lower portion of said downrod and said hub having a recess in the end thereof adapted to enclose the other in a mating connection;
   second electrical contact means in said hub aligned with said first electrical contact means and forming a mating connection therewith when said lower portion of said downrod and said hub are connected;
   locking means to releasably secure said hub and said lower portion of said downrod in rigid and non-rotating connection when one is enclosed in the other;

first electrical conductor means passing through the hollow interior of said downrod to said first electrical contact means and electrically connecting said first electrical contact means to a source of electric current; and second electrical conductor means electrically connecting said second electrical contact means to said electric motor.

2. Apparatus as in claim 1 wherein said locking means comprises aligned holes in said hub and said downrod and through rod means extending therethrough and seated therein.

3. Apparatus as in claim 2 wherein said through rod means is retained by a clip, cotter pin or sleeve.

4. Apparatus as in claim 1 wherein said recess is in said hub and said lower end of said downrod is enclosed therein in said connection.

5. Apparatus as in claim 4 wherein said first electrical contact means is mounted in an electrically insulating matrix recessed in the end of said lower portion of said downrod.

6. Apparatus as in claim 5 wherein said first electrical contact means are female electrical contacts.

7. Apparatus as in claim 6 wherein said female electrical contacts are recessed into said insulating matrix.

8. Apparatus as in claim 4 wherein said second electrical contact means is mounted in an electrically insulating matrix in said recess in said hub.

9. Apparatus as in claim 8 wherein said second electrical contact means are male electrical contacts which protrude upwardly from said matrix.

10. Apparatus as in claim 9 wherein one of said male contacts is in a neutral return portion of the electrical circuit formed by said conductor means, motor and contacts and protrudes farther upwardly from said matrix than the other male contacts.

11. Apparatus as in claim 1 further comprising cooperating means on said hub and said lower portion of said downrod to constrain the concentric alignment of said hub and said downrod.

12. Apparatus as in claim 11 wherein said cooperating means comprises a key and keyway.

13. Apparatus as in claim 12 wherein said key is disposed at the lower end of said downrod and said keyway is in said wall of said hub.

14. Apparatus as in claim 12 wherein said key is disposed at the top of said hub and said keyway is in said wall of said downrod.

15. Apparatus as in claim 1 wherein said downrod comprises two segments, with said upper portion in one segment and said lower portion in the other segment, with said segments secured together and the hollow interior thereof aligned to form a continuous hollow opening through said downrod.

16. Apparatus as in claim 15 wherein said segments are connected by mating screw threads.

17. Apparatus as in claim 1 wherein said device is a ceiling fan.

18. Apparatus as in claim 1 wherein said motor is at least partially enclosed in a housing and said hub is disposed atop or in said housing.

19. Apparatus as in claim 1 wherein said hub is attached to said motor.

20. Apparatus as in claim 18 wherein said downrod and said housing are electrically grounded through said wall of said downrod.

21. Apparatus as in claim 1 wherein said recess is in the end of said lower portion of said downrod and said hub is enclosed therein in said connection.

22. Apparatus as in claim 21 wherein said first electrical contact means are male contacts in said recess and said second electrical contact means are female contacts in said hub.

* * * * *

UNITED STATES PATENT AND TRADEMARK OFFICE
CERTIFICATE OF CORRECTION

PATENT NO.  : 4,810,207
DATED       : March 7, 1989
INVENTOR(S) : WILLIAM P. BUTTERFIELD and PAUL A. RIDGWAY It is certified that error appears in the above-identified patent and that said Letters Patent is hereby corrected as shown below:

On the Title Page, under Item [19], "Butterfield" should be --Butterfield et al.-- and Item [75], "William P. Butterfield" and should read as --William P. Butterfield and Paul A. Ridgway--

Column 10, line 9, in claim 13, cancel first instance of "said" and substitute --a--, therefor.

Signed and Sealed this

Nineteenth Day of September, 1989

Attest:

DONALD J. QUIGG

Attesting Officer

Commissioner of Patents and Trademarks